United States Patent [19]

Zenses

[11] 4,080,698
[45] Mar. 28, 1978

[54] ACCESSORY FOR A HAND DRILL

[76] Inventor: Carl Zenses, Raspelweg 10, 5630 Remscheid 15, Germany

[21] Appl. No.: 731,502

[22] Filed: Oct. 12, 1976

[30] Foreign Application Priority Data

May 8, 1976 Germany .............................. 2620383

[51] Int. Cl.² ........................ B23D 67/00; B27C 5/00
[52] U.S. Cl. .................. 29/76 R; 144/134 R
[58] Field of Search ............. 29/76, 76 A, 78, 103 R; 144/134 R, 134 D, 136 D, 136 E, 83, 251, 252 R, 253 D

[56] References Cited

U.S. PATENT DOCUMENTS

| 726,516 | 4/1903 | Deaton | 144/134 D |
|---|---|---|---|
| 819,578 | 5/1906 | McCoy | 29/76 R |
| 1,459,534 | 6/1923 | Hilker | 144/253 D |
| 2,382,147 | 8/1945 | Hanak | 144/251 R |
| 2,589,458 | 3/1952 | Toussiant | 144/134 D |
| 2,663,335 | 12/1953 | Gohm, Sr. | 144/83 |
| 2,687,561 | 8/1954 | Anderson | 29/76 R |
| 2,765,825 | 10/1956 | Neilson | 144/134 R |
| 2,771,104 | 11/1956 | Saxe | 144/134 D |
| 2,898,957 | 8/1959 | Demarkis | 144/134 D |

Primary Examiner—Harrison L. Hinson
Attorney, Agent, or Firm—Michael J. Striker

[57] ABSTRACT

A tool has a shank extending axially in one direction from a material-removing formation and engageable in the chuck of a handle-held electric drill, and has a shaft extending axially in the opposite direction. A handle is rotatable on but axially fixed on this shaft and a guide ring can be secured at any position along it. This guide ring can therefore ride along a guide and determine the exact axial position of the material-removing formation relative to the workpiece edge of a guide securable to the workpiece.

11 Claims, 6 Drawing Figures

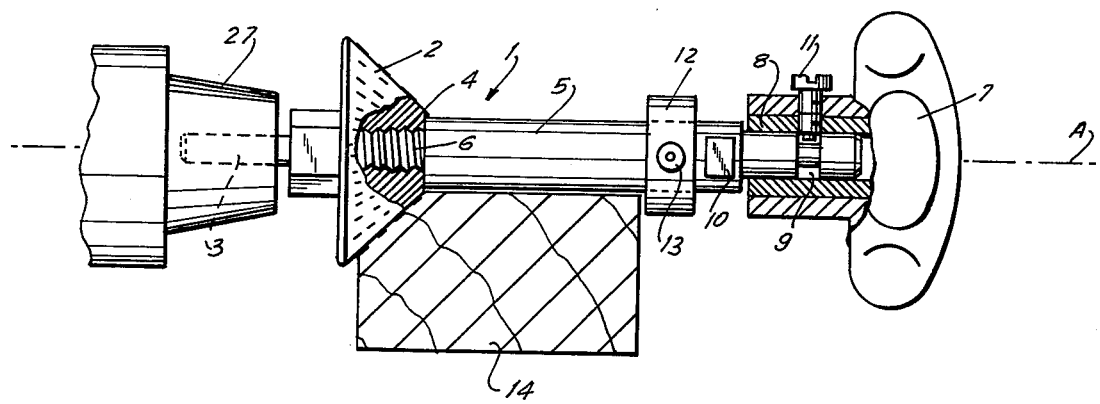
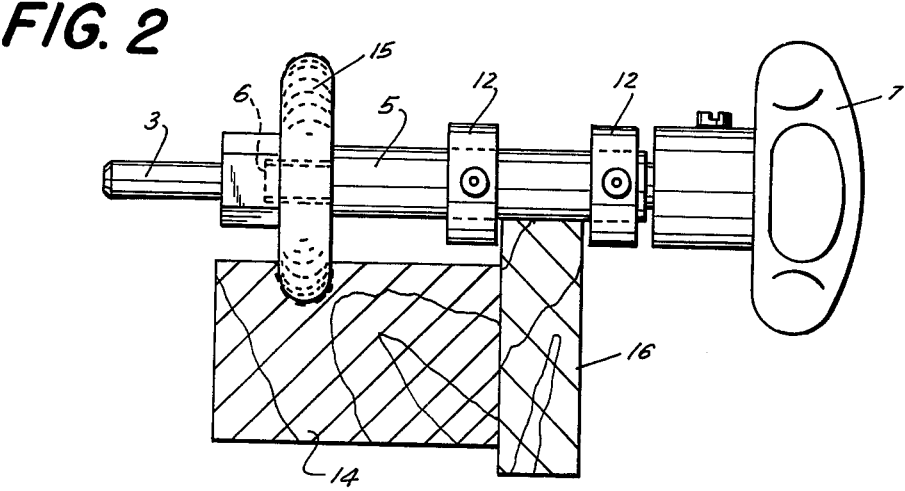
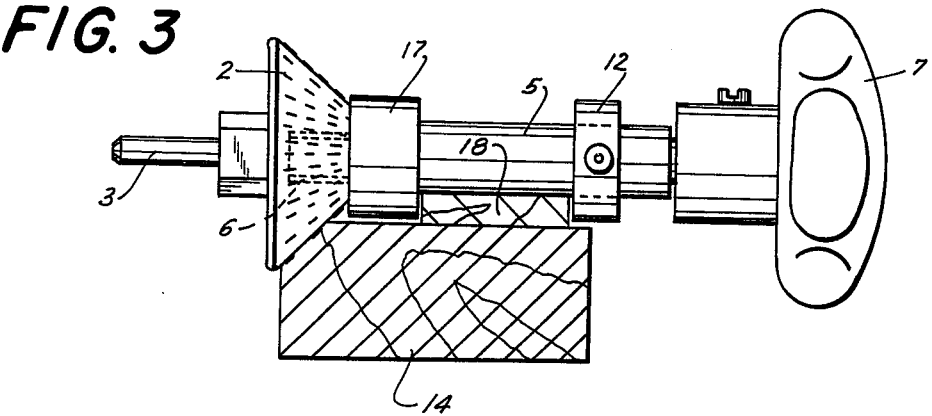

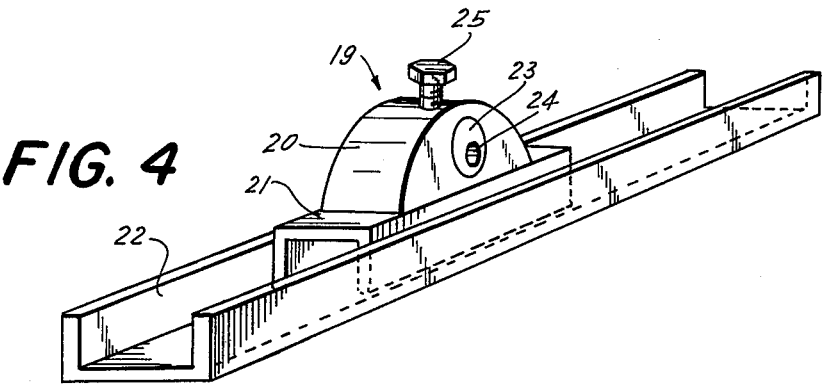
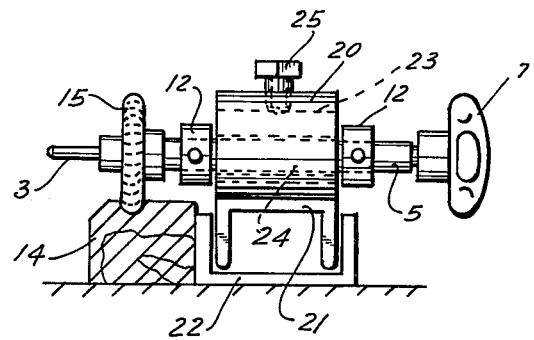
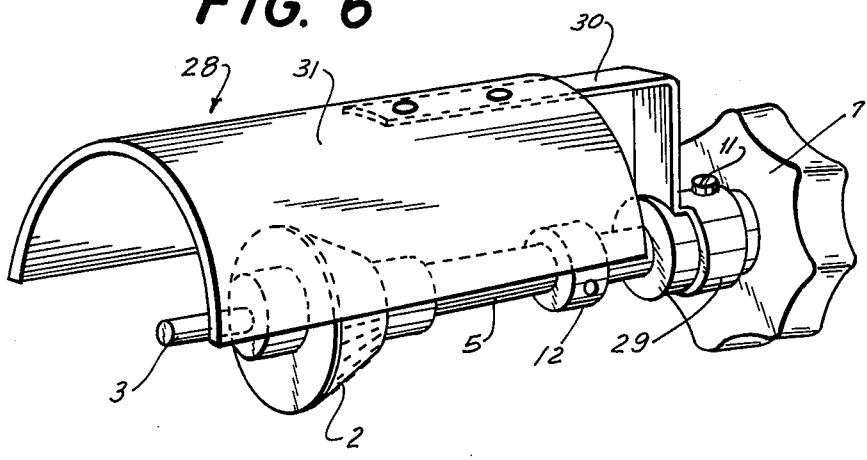

ACCESSORY FOR A HAND DRILL

CROSS-REFERENCE TO RELATED APPLICATION

This application is related to my copending patent application Ser. No. 669,597 filed Mar. 23, 1976 and now abandoned.

BACKGROUND OF THE INVENTION

The present invention relates to a material-removing tool. More particularly this invention concerns a tool that can be chucked in a hand-held drive unit such as a hand drill.

Although a power hand drill is primarily intended to bore holes, it is known to chuck in such a hand drill a material-removing tool that is rotated drill-fashion but which has lateral material-removing formations that are used to clean out holes or grind away an edge of a workpiece. This particular application of a power hand drill is most often seen in home use where the single power drive unit is used as the motive force for several different types of operations that normally would be carried out by separate units altogether. Thus it is known to fit in the chuck of the hand drill a rasp, a reamer, a rotary milling tool, a drum-type sander or milling tool and various other devices which must be pressed radially relative to the rotation axis of the tool against the workpiece.

Such use of a normally rotary tool has the considerable disadvantage that it is very difficult for the user holding the hand drill accurately to guide it. Thus, sloppy results are often obtained. For this reason the hand drill is obtained. For this reason the hand drill is often mounted in a bench stand so that it is fixed and the workpiece is displaced past it. Such an arrangement is fully unusable in many applications, as it is often impossible due to workpiece size or immobility to move the workpiece past the tool.

Another disadvantage of this type of arrangement is that considerable radial force is applied to the tool. Such radial force can cause the tool to break, not only damaging an often valuable tool but presenting a considerable danger for the user who is applying pressure against the tool. Furthermore such radial pressure puts a considerable load on the bearings of the drill which are often only designed to withstand axial pressure. Thus using the tool for reaming, filing, or milling often results in its premature wearing-out.

Another disadvantage of this type of operation with a hand drill is that the user must often assume a very uncomfortable position. For this reason he or she ties very rapidly and often does an inadequate job merely because fatigue has called a halt to the operation.

I disclose in my above-cited copending patent application a combination with a hand held drive unit having a chuck defining a chuck axis and adapted to move only in a predetermined non-radial manner relative to this chuck axis of a tool having a handle and means for securing the handle to a projection at the end of the tool so that this handle does not move with the tool as the tool is displaced by a chuck, but is in radial force-transmission with the tool. The tool in accordance with this invention has a central tool axis, a material-removing formation, a shank extending axially to one side of the formation and receivable within the chuck with the tool axis and the chuck axis aligned, and a projection extending axially to the other side of the formation. The handle is a simple knob, preferably made of synthetic-resin material and dimensioned so that it can be firmly held by the user in one hand while his or her other hand holds the drive unit. Thus with the system according to the present invention the tool is held to either side of its material-removing formation. This greatly unloads the drive unit, reduces the twisting stress on the tool enormously, and makes it relatively easy to guide the tool accurately.

The arrangement according to my earlier invention may also be used in a simple rotary-type hand drill constituting the drive unit. In this arrangement the projection at the end of the tool is of cylindrical shape and a correspondingly cylindrical hole is formed in the knob. The projection is rotatable within the knob but is axially fixed relative thereto by a pin projection radially inwardly in the hole in the knob into a circumferential groove in the projection of the tool. Thus, the knob can be held rigidly and non-rotatably while the tool rotates at high speed and the material-removing formations on the tool act on a workpiece. The material-removing formation may be milling teeth, a sanding disc, file teeth, reaming formations, or the like.

In accordance with my earlier invention the handle which is rotatable relative to the tool is provided with a pin constituted as the end of a screw threaded radially into the handle. This pin has a diameter which is slightly less than the axial length of the groove in the tool projection and has an end surface which is spaced slightly inwardly of the base of the groove. Thus, there is practically nothing to interfere with the rotation of the tool in the handle. A journal constituted as a bronze or brass bearing in the handle greatly increases the facility with which the tool rotates relative to the handle.

In accordance with further features of this previous invention the tool is provided with a guide that maintains the workpiece removing formation of the tool in a predetermined position relative to the workpiece. This guide can be a stop provided on the tool which engages axially or radially against the workpiece and, therefore, defines a predetermined position axially or radially between the two. The provision of one such radial stop formed as a ring around the tool and another axial stop constituted as a cap axially secured to the tool allows the arrangement to be used to neatly form a groove at the edge of a workpiece.

It is also within the scope of this earlier invention to constitute a guide device as a plate formed with a through-going hole in which the tool is journalled and connected to a guide so that it follows a predetermined path along the workpiece. The plate may be provided with pins that ride on the guide and determine this position and either the pins can be displaceable to vary the setting, or the hole can be formed eccentrically in a disc which may be rotated to vary the distance between the hole and the pins.

With the system according to my earlier filed application, it has been found, for example, possible to reduce the tooth height of a rotary file from between the conventional height of between 0.8 mm and 1 mm to between 0.3 mm and 0.5 mm. In this arrangement a handle having a weight of between 70 g and 120 g, preferably 85 g, is employed. Such an arrangement makes it extremely easy for example, to machine or mill the edge of a wooden board.

SUMMARY OF THE INVENTION

It is an object of the present invention to advance principles set forth in my above-identified copending patent application.

Another object is to provide an implement similar to that described in this above-mentioned application, but which allows a groove or cut to be formed along a workpiece.

Yet another object is the provision of such a tool which can accurately shape and edge of an elongated workpiece or form a groove or similar cut therealong.

These objects are attained according to the present invention in a combination similar to that described in my above-identified application, but wherein the tool has a shaft which extends from its material-removing formation into the handle and is provided with a guide ring that projects radially from the shaft and with means for securing this guide ring on the shaft in any of a plurality of axially offset positions. Therefore, it is possible to engage this guide ring axially against the workpiece or a guide secured to the workpiece in order to insure that the material-removing formation of the tool will follow a path that is exactly parallel to the workpiece edge or guide.

According to another feature of this invention the tool is provided with a second such guide ring which can be axially fixed on the shaft between the first ring and the tool formation. This allows the two rings to emrace a guide strip secured to the workpiece so that the material-removing formation can exactly cut a groove or similarly act on the workpiece parallel to this guide strip. It is also possible in accordance with this invention to embrace between these two rings a journal element having a throughgoing hole in which the shaft is rotatable and which is offset radially from the rotation axis of this journal element. This journal element can rotate itself within a guide and be fixed at any of a plurality of angularly offset positions in order to position the tool relative to the guide. This guide may be formed as a rail slidable in and along another rail which can be secured on or next to the workpiece.

In accordance with yet another feature of this invention a part-cylindrical and transparent shield is spaced radially from and at least partially surrounds the formation on the workpiece. This shield is secured to the handle and serves to protect the operator from shavings and the like.

The novel features which are considered as characteristic for the invention are set forth in particular in the appended claims. The invention itself, however, both as to its construction and its method of operation, together with additional objects and advantages thereof, will be understood from the following description of specific embodiments when read in connection with the accompanying drawings.

BRIEF DESCRIPTION OF THE DRAWINGS

FIG. 1 is a side view partly in section of the implement according to this invention;

FIG. 2 is a side view of another embodiment of the implement in accordance with the present invention;

FIG. 3 is yet a third embodiment of the implement in accordance with the present invention;

FIG. 4 is a perspective view of a guide useable with the implement in accordance with this invention;

FIG. 5 is an end view showing use of the guide of FIG. 4; and

FIG. 6 is a variation on the tool of FIG. 3.

SPECIFIC DESCRIPTION OF THE PREFERRED EMBODIMENTS

As shown in FIG. 1 the tool 1 according to this invention is adapted to be mounted in the chuck 27 of a conventional electric drill for rotation of this tool about an axis A. The tool has a shank 1 which is adapted to be locked in a chuck 3 and on which is carried a here frustoconically shaped milling tool or rasp 2 which tapers away from the chuck 27. The tool 2 is formed with an axially opening threaded hole 4 having a fine metric thread M 8.4 × 1.15. A cylindrical shaft 5 also centered on the axis A has one end 6 which is threaded into this hole 4 and another end formed with a circumferential radially open groove 9 and journalled in a bronze bearing 8 held in a handle 7. A radially extending screw 11 has a pin-like end engaged in the groove 9 so as axially to fix the elements 5 and 7 relative to each other but allow them to rotate relative to each other. In addition the shaft 5 is formed with a facet 10 allowing it to be grasped tightly by a ranch for mounting the shaft 5 on the tool 2.

In addition the shaft 5 carries a generally cylindrical ring 12 which can be secured at any position along this shaft 5 by means of an Allen screw 13. Thus it is possible as shown in FIG. 1 to rotate tool 1 about the axis A with the chuck 27 while holding the drill carrying this chuck 27 in one hand and the handle 7 in the other. The shaft 5 is laid on top of a workpiece 14 and the ring 12 is brought axially to bear against the edge of the workpiece. This exactly positions the tool 2 over the other edge of the workpiece so as to form a very precise level along this tool edge.

The arrangement shown in FIG. 2 is substantially identical to that shown in FIG. 1 except that here two guide rings 12 with respective screws 13 are provided. In addition, the tool 2 is replaced by an axially short rasp 15 which is here used to form a groove between the edges of the elongated workpiece 14. To this end a guide strip 16 is secured next to the workpiece 14 and embraced between the rings 12 so as to define a precise axial position for the tool 15.

In the arrangement of FIG. 3 there is provided a second ring 17 immediately adjacent the workpiece 2. A guide strip 18 is secured to the top of the workpiece 14 and is embraced between the rings 12 and 13 in order to define a precise axial position and depth of cut for the workpiece 2.

FIG. 6 shows how the arrangement of FIG. 3 can be provided with a shield 28 comprising a part-cylindrical synthetic-resin sheet 13 held by a bracket 30 to a ring 29 clamped by the screw 11 into the handle 7. Thus this shield 28 is not moved relative to the handle 7 so that it can protect an operator using the device from flying splinters or the like.

The arrangement of FIGS. 1 or 2 can be used in conjunction with the system shown in FIGS. 4 and 5. Here a guide 19 is provided which is constituted by a journal block 20 in which is rotatable a sleeve 23 having an eccentric bore 24. The shaft 5 is passed through the bore 24 and the sleeve 23 can be locked in any angular position by means of a screw 25 so as to establish the radial position of the shaft 5 relative to a guide rail 21 formed as a downwardly opened channel receivable within an upwardly open channel 22 securable next to the workpiece 14 as shown in FIG. 5. Thus it is possible for the user to determine the depth of cut with this arrangement and at the same time to form a perfectly straight cut along a workpiece even when this workpiece does not have a straight edge that can serve as a guide.

With the system according to the present invention it is therefore possible to form a cut that follows a straight line along the workpiece either parallel to an edge of the workpiece or to a guide securable on or adjacent the workpiece. The depth of the cut can also accurately be controlled in accordance with this invention so that a relatively simple home-use hand drill can be employed to perform relatively sophisticated woodworking or metalworking operations.

It will be understood that each of the elements described above, or two or more together, may also find a useful application in other types of tools differing from the types described above.

While the invention has been illustrated and described as embodied in an accessory for a hand drill, it is not intended to be limited to the details shown since various modifications and structural changes may be made without departing in any way from the spirit of the present invention.

Without further analysis the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with a hand-held electric drill having a chuck defining a chuck axis and adapted to rotate about said chuck axis;
   a tool having a tool axis, a material-removing formation, a shank extending axially to one side of said formation and receivable within said chuck with said axes aligned, and a shaft extending axially to the other side of said formation;
   a handle;
   means for securing said handle to said shaft for force transmission between said handle and said tool radially of said tool axis and for relative freedom of motion of said tool and said handle on rotation of said tool about said chuck axis;
   a first guide ring on said shaft between said handle and said formation and projecting radially from said shaft;
   means for securing said first guide ring on said shaft in any of a plurality of axially offset positions thereon;
   a guide strip on said workpiece extending therealong in a guide direction adjacent a region of said workpiece to be worked by said formation, said guide strip having a predetermined width;
   a second guide ring on said shaft between said handle and said formation and projecting radially from said shaft; and
   means for securing said second guide ring on said shaft in a position spaced axially from said first guide ring by a distance equal substantially to said predetermined width, whereby said shaft can rest on said guide strip with said guide rings flanking same so that said formation can work said region as said tool is displaced along said guide strip.

2. The combination defined in claim 1 wherein said handle is received with an axially extending hole, said shaft being received in said hole.

3. The combination defined in claim 2 wherein said shaft is formed with a circumferential groove, said means for securing said handle including a pin secured in said handle and extending radially into said groove.

4. The combination defined in claim 1 wherein said tool is formed generally at said formation with a threaded hole opening axially away from said shank, said shaft having a threaded end in said hole.

5. The combination defined in claim 4 further said shaft is formed with facets shaped to be engaged by a wrench.

6. The combination defined in claim 1, further comprising a shield radially spaced from and at least partially surrounding said formation and means for mounting said shield on said handle.

7. The combination defined in claim 6 wherein said shield is generally part-cylindrical and transparent.

8. The combination defined in claim 1, further comprising a journal surrounding said shaft between said ring and said formation, a rail securable adjacent a workpiece and defining a path, and a guide on said journal displaceable on said rail along said path.

9. The combination defined in claim 8, further comprising a second such ring on said shaft between said journal and said formation, said journal being snugly received between said rings.

10. in combination with a hand-held electric drill having a chuck defining a chuck axis and adapted to rotate about said chuck axis:
    a tool having a tool axis, a material-removing formation, a shank extending axially to one side of said formation and receivable within said chuck with said axes aligned, and a shaft extending axially to the other side of said formation;
    a handle;
    means for securing said handle to said shaft for force transmission between said handle and said tool radially of said tool axis and for relative freedom of motion of said tool and said handle on rotation of said tool about said chuck axis;
    a guide ring on said shaft between said handle and said formation and projecting radially from said shaft;
    means for securing said guide ring on said shaft in any of a plurality of axially offset positions thereon;
    a journal surrounding said shaft between said ring and said formation;
    a rail securable adjacent a workpiece and defining a path;
    a guide on said journal displaceable on said rail along said path;
    an element in said guide rotatable about an element axis therein and formed with a hole parallel to and offset from said element axis and constituting said journal; and
    means for locking said element in any of a plurality of angularly offset positions in said guide.

11. The combination defined in claim 10 wherein said guide is a second such rail slidable along the first-mentioned rail.

* * * * *